Figure 1:
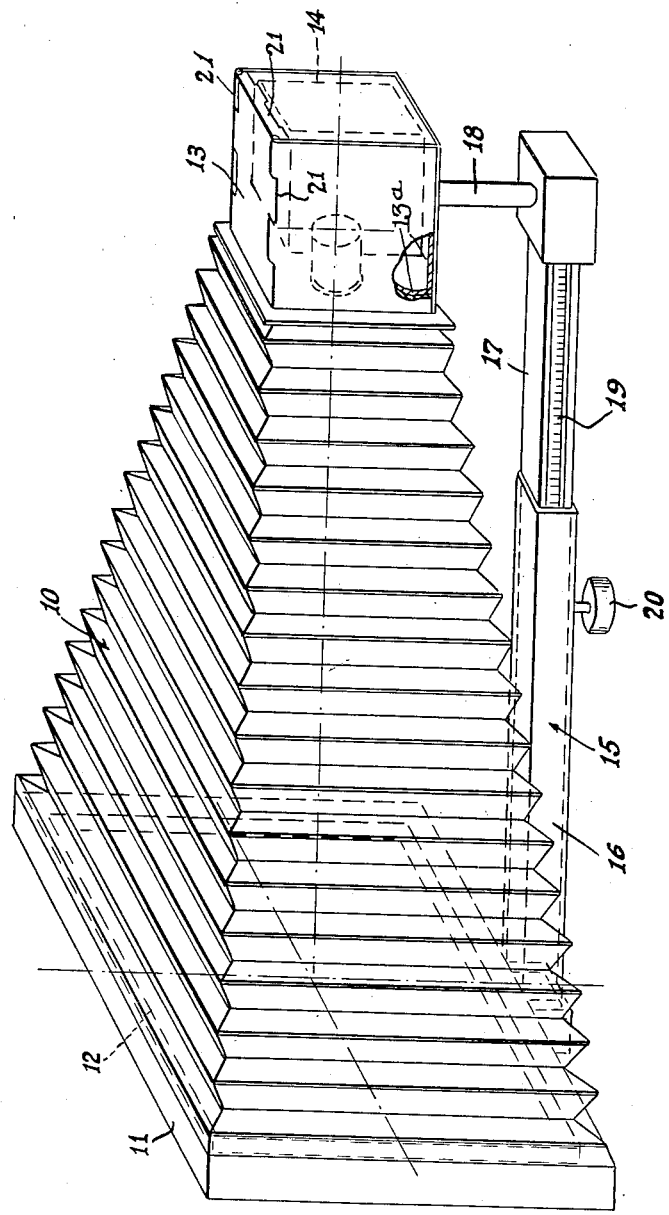

June 25, 1940.    J. JANY    2,205,853
APPARATUS FOR THE FILMING OF X-RAY IMAGES
Filed April 25, 1939    2 Sheets-Sheet 1

José Jany
INVENTOR
BY
his ATTORNEY

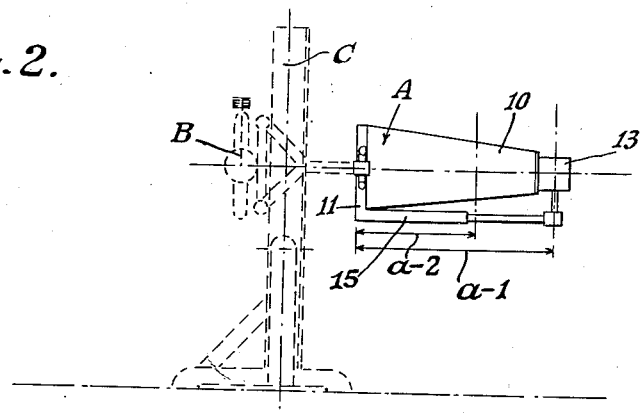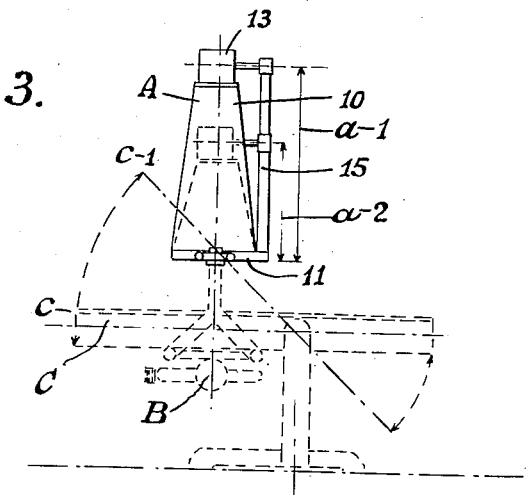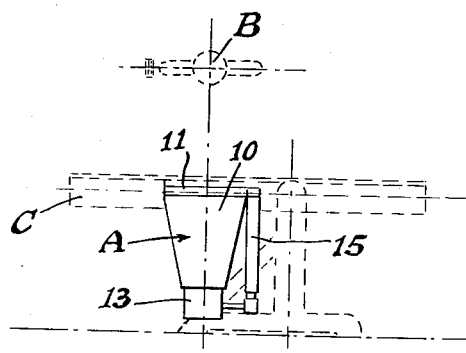

Patented June 25, 1940

2,205,853

UNITED STATES PATENT OFFICE 2,205,853

APPARATUS FOR THE FILMING OF X-RAY IMAGES

José Jany, Sao Paulo, Brazil

Application April 25, 1939, Serial No. 269,844
In Brazil August 6, 1938

4 Claims. (Cl. 250—65)

The invention relates to apparatus for the cinematographic filming of X-ray images, more particularly X-ray images in motion and for radioscopic purposes.

An object of the present invention is to provide improved and simplified apparatus capable of easy adaptation and universal employment without the necessity of a dark room.

According to the present invention the image recorded by the cinematographic camera is that produced by the X-ray upon a fluorescent screen.

In order that the invention may be more readily understood, one construction embodiment thereof will now be described with reference to the accompanying drawings wherein, Fig. 1 is a perspective view of an apparatus according to the present invention suitable for application to an existing X-ray installation, Figs. 2, 3 and 4 are diagrammatic side elevations illustrating a number of different positions of use readily obtainable with the apparatus shown in Fig. 1 when used in conjunction with a usual form of X-ray table and existing X-ray installation.

Referring first to Fig. 1 it will be seen that the apparatus comprises an extensible bellows 10 made of leather or similar pliable and light impervious material. The larger end of the bellows is secured in a light-tight manner to a frame 11 carrying a fluorescent screen 12 while the other and smaller end of the bellows is secured, also in a light-tight manner, to a box-like enclosure 13 housing a cinematographic filming camera 14.

The degree of extension of the bellows 10 is controlled by the frame 11 and box-like enclosure 13 being supported in proper relative positions by a telescopic tube structure 15 comprising a rectangular section metal tube 16 rigidly secured to the frame 11 and a smaller rectangular metal tube 17 connected by a pillar 18 to the box-like enclosure 13 and slidable within the tube 16. The tube 17 is provided with a graduated scale 19 for giving a visual indication of the focal setting of the apparatus. A set screw 20 serves to lock the apparatus in any adjusted position.

The box-like enclosure 13 is constructed of aluminium and is lined throughout with lead sheeting 13ª to protect the camera 14 from secondary X-rays. The side walls of the enclosure are arranged to be movable, being hinged as shown at 21 and spring urged into closed position, to allow ready access to the camera 14.

An aperture is provided in the end wall of the box-like enclosure 13 for viewing the fluorescent screen whereby the image exposed to the camera may be ascertained.

The camera 14 may be of any suitable form, and is preferably provided with a lens of at least 1:0.85, illuminating power for films of 16 mm. size. The fluorescent screen 12 conveniently has a size of 40 cms. x 40 cm. while the bellows 10 may be extensible from about 50 cms. to 2 meters.

The apparatus described is readily adapted to any existing X-ray table to which it may be attached by clamps or screws (in accordance with the construction of the particular table), usually by means of the frame designed for the fluorescent screen.

In use, the bellows 10 are first extended to a suitable focal setting, corresponding with the desired size of image, the set-screw 20 is tightened and the focal distance read on the graduated scale 19. The lens of the camera 14 is then focused in accordance with such reading.

It is not necessary to centre the optical axis of the camera lens with relation to the centre of the fluorescent screen since this is already definitely assured by the fixed position of the filming camera 14 in the enclosure 13.

The camera is then prepared for use as regards the film-moving mechanism and regulation of the film speed (number of images per second).

Finally, the X-ray tube is energized, and the camera keys are released to commence filming of the images projected onto the screen 12.

By means of the opening in the end wall of the enclosure 13, it is possible to control the exact position of the organ to be filmed in relation to the centre of the screen 12.

A number of different positions in which the apparatus can be employed are shown in Figs. 2, 3 and 4. In these figures A denotes the filming apparatus already described, a—1 indicates the maximum extension of bellows and a—2 the minimum extension of bellows.

B denotes the X-ray tube and C the X-ray table.

Fig. 2 shows the arrangement for filming a patient from front to back, the patient in this case being in standing position. Fig. 3 shows the arrangement for filming a patient from above downwardly, the patient in this case reclining in either a horizontal position, as shown at c, or sloping at any desired angle, as shown at c—1. Fig. 4 shows an arrangement for filming a patient from below upwardly, the patient reclining in a horizontal position (in this case the apparatus will be fixed to the X-ray table in the place of the diaphragm employed for restricting the area exposed to X-rays, instead of being fixed into the frame for the fluorescent screen).

The above-described arrangement according to the present invention has a considerable number of advantages including:

The adjustable bellows permits filming at any focal distance with rapid and accurate focusing, effected by means of the lens adjustment in accordance with the reading of the scale 19.

The fixed location of the fluorescent screen 12 within the light-tight bellows 10 permits the apparatus to be used in daylight and renders the use of a dark room unnecessary.

The opening in the end wall of the enclosure 13 permits accurate control of the images produced on the fluorescent screen 12.

The lining of the enclosure with lead sheeting prevents fogging of the film by secondary X-rays.

All parts of the camera are readily accessible, due to the provision of spring controlled movable walls for the enclosure 13.

The apparatus is adaptable to any X-ray installation of average capabilities, and can function with any type of X-ray bulb having a revolving anode. This is obtained by the use of ultra-sensitive films or films with emulsion sensitized after exposure, resulting in a reduction of the necessary charge in the X-ray bulb, and, consequently, a reduction of the X-ray emission which is always harmful to the patient.

In consequence of such reduction in the X-ray charge, it is possible to dispense with the use of known arrangements for the protection of the patient, such as for example, an electric motor timed to the motion of the film, high frequency generator, cylinder and contacts for the secondary switch of the X-ray bulb charge, the employment of which devices is necessary in all other Roentgen-Cinematographic systems.

The apparatus is readily and rapidly set up and taken down, and the X-ray installation to which it is applied may continue to operate in the usual way.

By reason of its adjustability, its rigidity of construction and suspension, and its limited weight, the apparatus can be employed under all conditions and in all conceivable positions of the patient.

I claim:

1. An apparatus for the cinematographic filming of X-ray images, comprising a frame adapted to be attached to an X-ray apparatus, a fluorescent screen mounted in said frame, a light-impervious extensible bellows of pyramid form having its larger end attached to said frame, a box-like enclosure open on one side thereof and being attached with its open side to the smaller end of said bellows, a photographic film camera disposed in said box-like enclosure and having a lens centered with respect to said bellows and fluorescent screen, and an extensible bracket between said frame and box-like enclosure.

2. An apparatus, as claimed in claim 1, in which said extensible bracket comprises two tubular members telescoped within one another, one of said members being rigid with said frame, a pillar connecting said box-like enclosure rigidly with the second tubular member and means to lock said tubular members in any desired position relative to one another.

3. An apparatus, as claimed in claim 1, in which said box-like enclosure is lined with lead sheeting to protect the camera from secondary X-rays.

4. An apparatus, as claimed in claim 1, in which said box-like enclosure comprises spring controlled movable walls to permit ready access to said camera.

JOSÉ JANY.